United States Patent
Birrell

(10) Patent No.: US 9,315,204 B1
(45) Date of Patent: Apr. 19, 2016

(54) RECYCLING CART

(71) Applicant: Christopher Birrell, Oshawa (CA)

(72) Inventor: Christopher Birrell, Oshawa (CA)

( * ) Notice: Subject to any disclaimer, the term of this patent is extended or adjusted under 35 U.S.C. 154(b) by 0 days.

(21) Appl. No.: 14/602,028

(22) Filed: Jan. 21, 2015

(51) Int. Cl.
*B62B 3/10* (2006.01)

(52) U.S. Cl.
CPC .......................... *B62B 3/10* (2013.01)

(58) Field of Classification Search
CPC ........ B62B 3/002; B62B 3/003; B62B 3/005; B62B 3/04; B62B 3/10; B62B 3/104; B62B 5/064; B62B 5/066; B62B 2202/02; B62B 2202/028; B62B 2202/12; B62B 2202/20
USPC .......... 280/47.34, 47.35, 47.371, 79.11, 79.2, 280/79.5, 79.3, 655.1
See application file for complete search history.

(56) References Cited

U.S. PATENT DOCUMENTS

| | | | | |
|---|---|---|---|---|
| 5,375,860 A * | 12/1994 | Ernsberger | ................ | B62B 3/00 220/909 |
| 5,820,143 A | 10/1998 | Rigo | | |
| 6,676,141 B1 | 1/2004 | Hadley | | |
| 7,293,786 B2 * | 11/2007 | Burton | ................... | A47B 31/00 280/47.371 |
| 7,648,147 B2 * | 1/2010 | Lauer | ....................... | B62B 3/02 280/47.35 |
| 7,988,160 B2 * | 8/2011 | Lindner | .................. | B62B 3/008 280/47.34 |
| 8,037,833 B2 * | 10/2011 | Hardy | ................ | A47B 87/0269 108/91 |
| 8,408,564 B2 * | 4/2013 | Hutchinson | ............... | B62B 3/04 280/47.34 |
| 8,419,024 B1 * | 4/2013 | Arroyo-Ferrer | ........ | B62B 3/005 280/47.35 |
| 8,696,028 B2 * | 4/2014 | Nelson | .................... | A47L 13/50 280/47.34 |
| 9,113,706 B1 * | 8/2015 | Cannon | ................ | A47B 87/007 |
| 2008/0295870 A1 * | 12/2008 | Perelli | ..................... | A47L 13/22 134/42 |
| 2009/0189498 A1 * | 7/2009 | Catron | ..................... | B62B 3/02 312/249.8 |

* cited by examiner

*Primary Examiner* — John Walters
(74) *Attorney, Agent, or Firm* — Crossley & Stevenson IP Law

(57) ABSTRACT

A recycling cart disposed on a wheeled platform. A trash can for non-recyclable trash and a green-colored bin for compostable materials are removably disposed on the platform. A shelf storage unit permanently disposed on the platform includes a divider separating upper and lower compartments. An upper recycle box within the upper compartment receives recyclable plastics, while a lower recycle box within the lower compartment receives recyclable cardboard and paper. An upper compartmentalized unit on a front side of shelf storage unit receives small recyclable items such as batteries, cartridges, and certain types of lights. An external handle is attached to the shelf storage unit. A storage area for recyclable broken down cardboard is defined by a gap between a vertical support plate on a rear end of the recycling cart and the shelf storage unit.

5 Claims, 5 Drawing Sheets

RECYCLING CART

BACKGROUND OF THE INVENTION

Various types of recycling receptacles are in use and are known in the prior art. However, most recycling receptacles are "single unit" or "single purpose" receptacles by generally accepting only one of aluminum, metal, newspaper, plastic, or some other recyclable material. The recycling cart of the present invention is provided to receive all of the foregoing recyclable materials in a single movable cart.

FIELD OF THE INVENTION

Various types of recycling receptacles are in use and are known in the prior art. Most recycling receptacles are "single unit" or "single purpose" receptacles by generally accepting only one of aluminum, metal, newspaper, plastic, or some other recyclable material. Single purpose recycling receptacles can be inconvenient as it may take a long time to properly empty these containers when these receptacles are full. The present recycling cart is provided to receive all of the foregoing recyclable materials in a single cart that is mobile and can easily be relocated to a particular area.

SUMMARY OF THE INVENTION

The recycling cart is disposed on a platform that is mounted on four wheels, with two of the wheels being locking wheels. A trash can for receiving non-recyclable trash and a colored bin, preferably green colored, for receiving compostable materials are removably disposed on the platform. The green coloring of the green-colored bin signifies that compostable materials only are deposited therein. A shelf storage unit is disposed on the platform as well and includes a divider that creates an upper compartment and a lower compartment. An upper recycling box within the upper compartment receives plastics, while a lower recycling box disposed within the lower compartment receives cardboard and paper. An upper compartmentalized unit is also associated with the shelf storage unit and is devised to receive small recycled items such as batteries, cartridges, and certain types of lights. The cart also has an external handle pivotally attached to the shelf storage unit and an additional storage area for recyclable broken down cardboard to be placed.

DETAILED DESCRIPTION OF THE DRAWINGS

Figure 1:
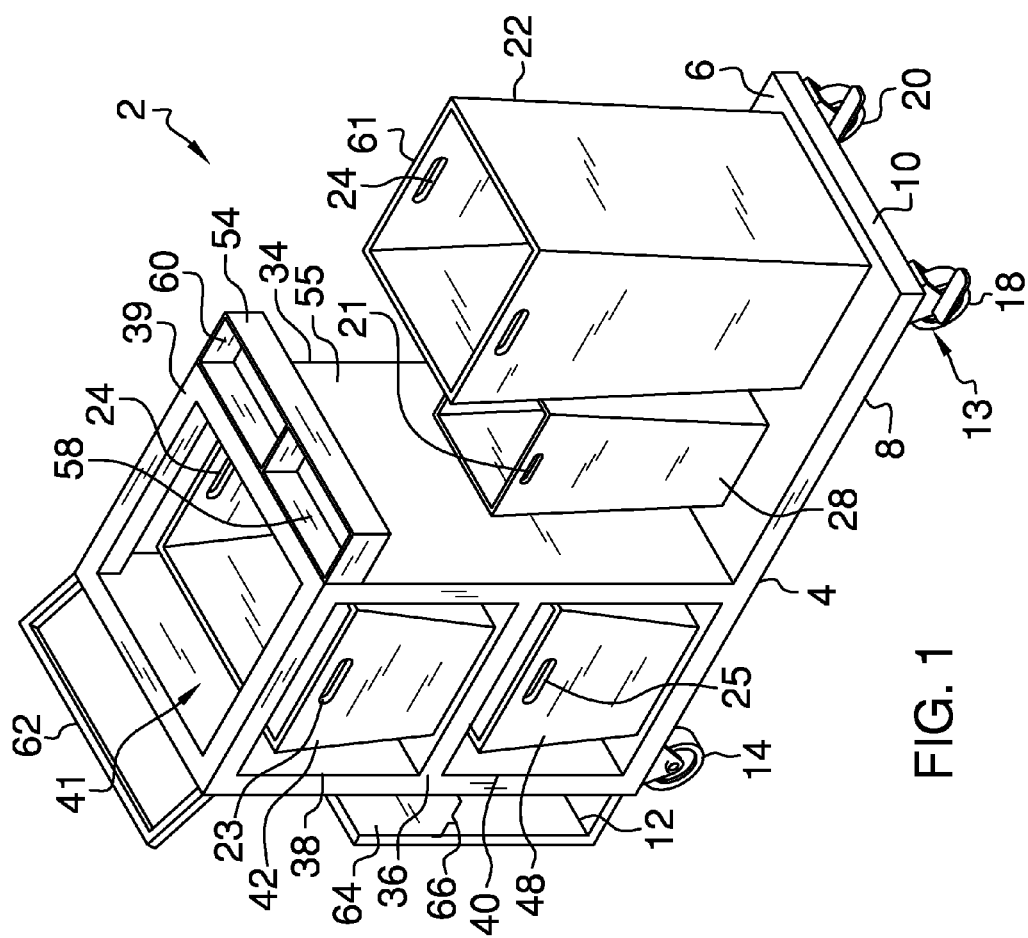
FIG. 1 is an isometric view.
Figure 2:
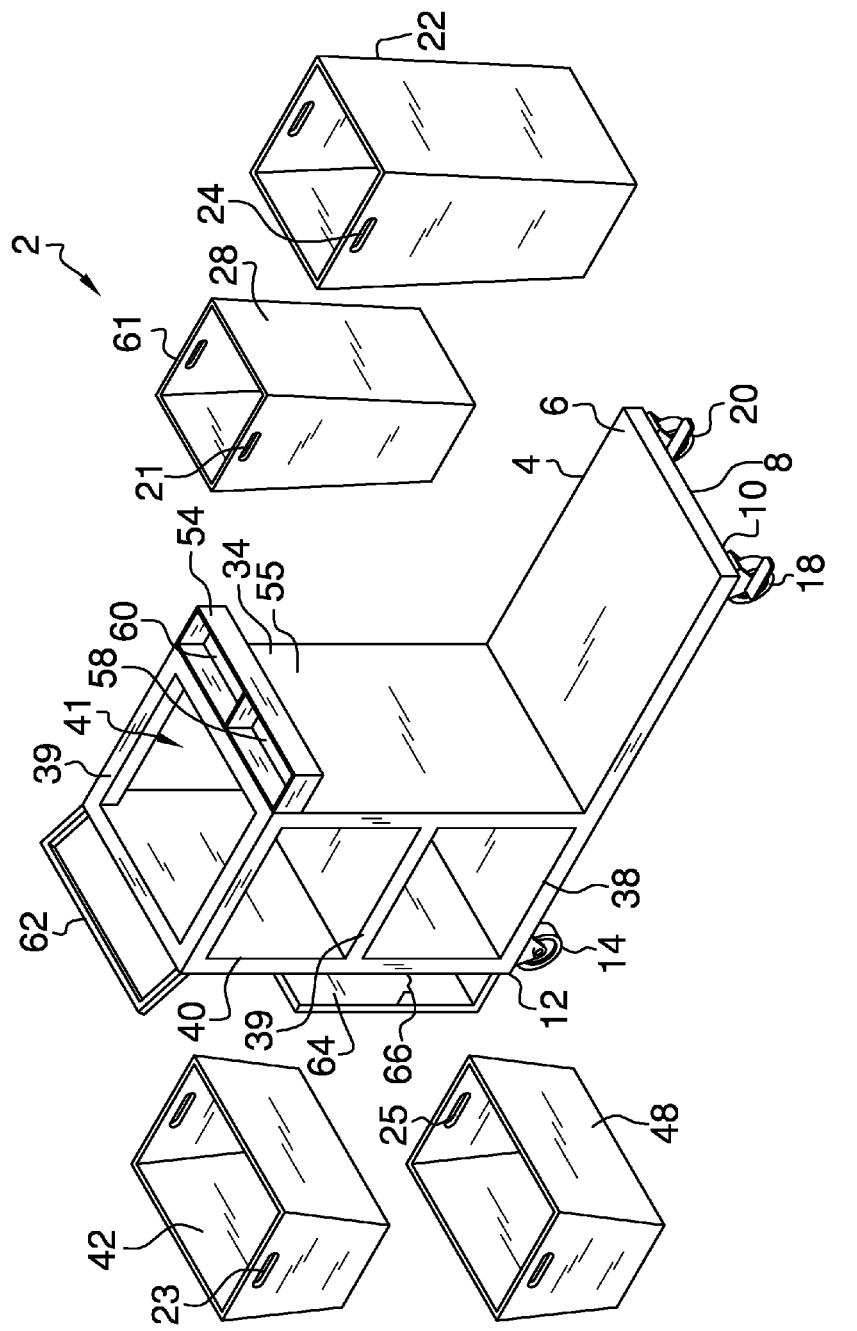
FIG. 2 is an exploded isometric view.
Figure 3:
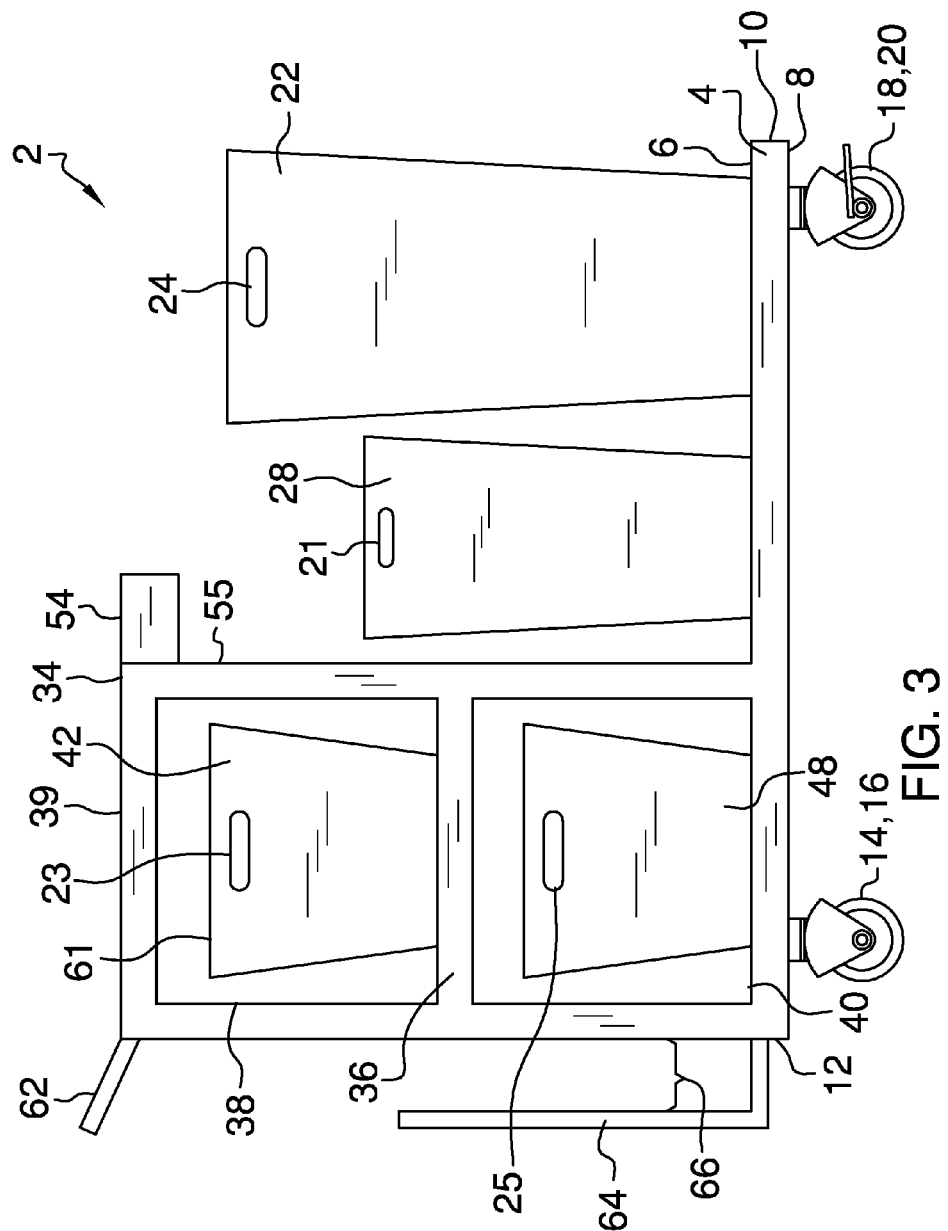
FIG. 3 is a front elevation view.
Figure 4:
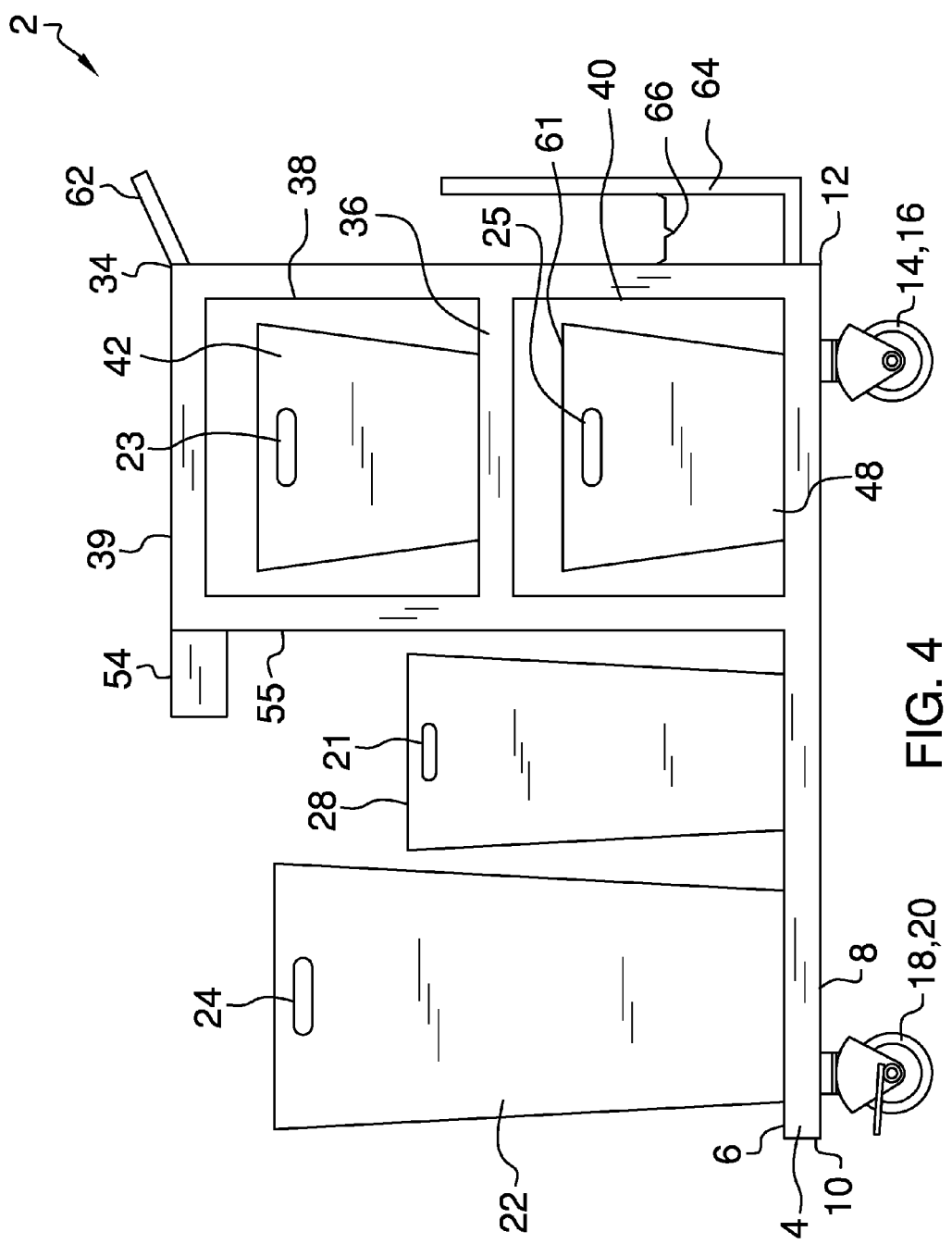
FIG. 4 is a rear elevation view.
Figure 5:
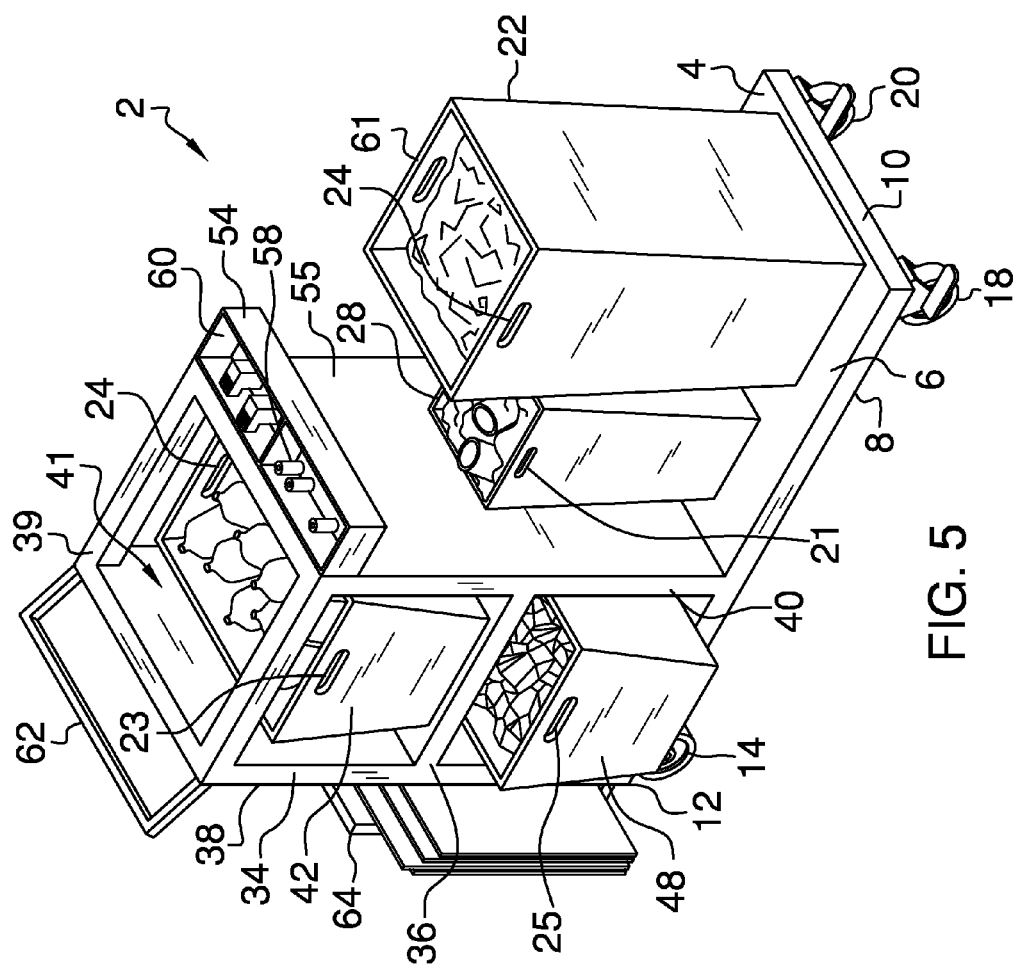
FIG. 5 is an in-use perspective view.

With reference now to the drawings, and in particular FIGS. 1 through 5 thereof, an example of the recycling cart employing the principles and concepts of the present invention and generally designated by the reference number 2 will be described.

Referring to FIGS. 1 through 5, a preferred embodiment of the present invention is disclosed. The recycling cart 2 disclosed herein includes a platform 4 that has an upper surface 6, a lower surface 8, a front end 10, and a rear end 12. Furthermore, the platform 4 has a plurality of wheels 13 disposed on the lower surface 6. The plurality of wheels includes non-locking wheels 14, 16 attached proximal the rear end 12 of the platform 4 and locking wheels 18, 20 attached proximal the front end 10 of the platform 4.

A trash can 22 is disposed on the upper surface 6 of the platform 4. The trash can 22 has a pair of trash can handles 24. A colored bin 28, preferably green colored, is disposed on the upper surface 6 immediately adjacent to the trash can 22. The colored bin 28 also has a pair of colored bin handles 21. Trash can 22 is devised to receive non-recyclable trash, while colored bin 28 receives compostable waste, such as yard waste. The green coloring of the colored bin 28 signifies that compostable materials only are deposited therein. The colored bin 28 has a height approximately three-fourths of a height of the trash can 22, which is a visual cue, other than the green coloring of the colored bin, to differentiate the colored bin 28 from the trash can for the receipt of compostable materials and non-recyclable trash, respectively. The height differentiation assists users who are color-blind to differentiate between the colored bin 28 and the trash can 22.

A shelf storage unit 34 is permanently disposed on the upper surface 6 of the platform 4 proximal the rear end 12 of the platform 4. The shelf storage unit 34 has a continuous horizontally-disposed divider 36 which separates an upper compartment 38 from a lower compartment 40 of the shelf storage unit 34. The shelf storage unit 34 has a top surface 39 and a continuous opening 41 centrally disposed in the top surface. The upper compartment 38 extends upwards to the top surface 39 of the shelf storage unit 34.

An upper recycle box 42 is removably disposed in the upper compartment 38 and has a pair of upper recycle box handles 23, while a lower recycle box 48 is disposed in the lower compartment 40 and also has a pair of lower recycle box handles 25. Upper recycle box 42 is preferably configured to receive recyclable plastics therein, while lower recycle box 48 is preferably configured to receive recyclable cardboard and paper therein. The opening 41 in the top surface 39 permits recyclable plastics to be disposed in the upper recycle box 42 without having to remove the upper recycle box 42 from the upper compartment 38.

An upper compartmentalized unit 54 is disposed on a front side 55 of the shelf storage unit adjacent to the top surface 39 thereof. The upper compartmentalized unit 54 has a left bin 58 and a right bin 60. Each of the right and left bins 58, 60 is configured to receive items such as recyclable batteries, cartridges, certain types of lights, and other small recyclable items therein.

The platform 4 also includes an external handle 62 pivotally attached to the shelf storage unit 34 that allows the entire cart to be easily moved. Furthermore, the platform 4 includes a solid vertical support plate 64 continuously disposed across the rear end 12 of the platform 4. A storage area 66, in which recyclable broken down cardboard can be placed for later recycling, is defined by a continuous gap between the vertical support plate 64 and the shelf storage unit 34.

What is claimed is:
1. A recycling cart comprising:
  a platform having an upper surface, a lower surface, a front end and a rear end;
  a plurality of wheels disposed on the lower surface of the platform;
  a trash can removably disposed on the upper surface of the platform, the trash can having a pair of trash can handles;
  a colored bin removably disposed on the upper surface of the platform, the colored bin having a pair of colored bin handles;
  a shelf storage unit permanently disposed on the upper surface of the platform proximal the rear end of the platform, the shelf storage unit having a continuous horizontally-disposed divider and a top surface;
a pair of compartments disposed within shelf storage unit comprising an upper compartment and a lower compartment, wherein the divider separates the upper and lower compartments from each other, wherein the upper compartment extends upwards to the top surface of the shelf storage unit;
an upper recycle box disposed within the upper compartment, the upper recycle box having a pair of upper recycle box handles;
a lower recycle box disposed within the lower compartment, the lower recycle box having a pair of lower recycle box handles;
an external handle attached to the shelf storage unit;
a solid vertical support plate continuously disposed across the rear end of the platform;
a storage area defined by a continuous gap between the vertical support plate and the shelf storage unit; and
an upper compartmentalized unit disposed on a front side of the shelf storage unit adjacent to the top surface thereof; and
a left bin and a right bin disposed in the upper compartmentalized unit;
wherein the colored bin is further colored differently from each of the left and right bins;
wherein the colored bin is colored differently from each of the trash can, the shelf storage unit, and the upper and lower recycle boxes.

2. The recycling cart according to claim 1 wherein the colored bin has a height approximately three-fourths of a height of the trash can.

3. The recycling cart according to claim 2 wherein at least two of the plurality of wheels are locking wheels.

4. A recycling cart comprising:
a platform having an upper surface, a lower surface, a front end, and a rear end;
a quartet of wheels disposed on the lower surface of the platform, wherein at least two of the four wheels of the quartet of wheels are locking wheels;
a trash can removably disposed on the upper surface of the platform, the trash can having a pair of trash can handles, wherein the trash can is configured to receive non-recyclable trash therein;
a green-colored bin placed on the upper surface of the platform, the green-colored bin having a pair of colored bin handles, wherein the green-colored bin has a height approximately three-fourths of a height of the trash can, wherein the green-colored bin is configured to receive compostable waste therein;
a shelf storage unit permanently disposed on the upper surface of the platform proximal the rear end of the platform, the shelf storage unit having a continuous horizontally-disposed divider and a top surface;
a pair of compartments disposed within shelf storage unit comprising an upper compartment and a lower compartment, wherein the divider separates the upper and lower compartments from each other, wherein the upper compartment extends upwards to the top surface of the shelf storage unit;
an upper recycle box disposed within the upper compartment, the upper recycle box having a pair of upper recycle box handles, wherein the upper recycle box is configured to receive recyclable plastics therein;
a lower recycle box disposed within the lower compartment, the lower recycle box having a pair of lower recycle box handles, wherein the lower recycle box is configured to receive recyclable cardboard and paper therein;
an external handle attached to the shelf storage unit;
a solid vertical support plate continuously disposed across the rear end of the platform;
a storage area defined by a continuous gap between the vertical support plate and the shelf storage unit, wherein the storage area is configured to receive recyclable broken down cardboard;
an upper compartmentalized unit disposed on a front side of the shelf storage unit adjacent to the top surface thereof; and
a pair of bins disposed in the upper compartmentalized unit, the pair of bins comprising a left bin and a right bin.

5. The recycling cart of claim 4 further comprising a continuous opening centrally disposed in the top surface.

* * * * *